Aug. 20, 1946.  H. G. MUSGRAVE ET AL  2,406,098
INDEX ACTUATING MECHANISM
Filed Nov. 27, 1944    2 Sheets-Sheet 1
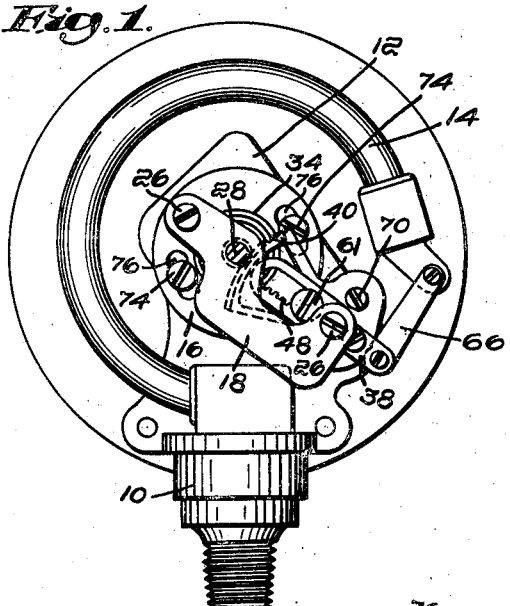
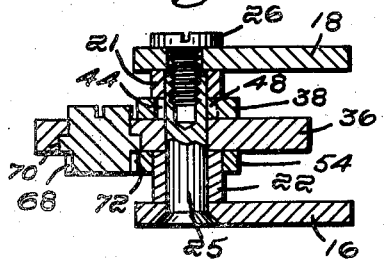
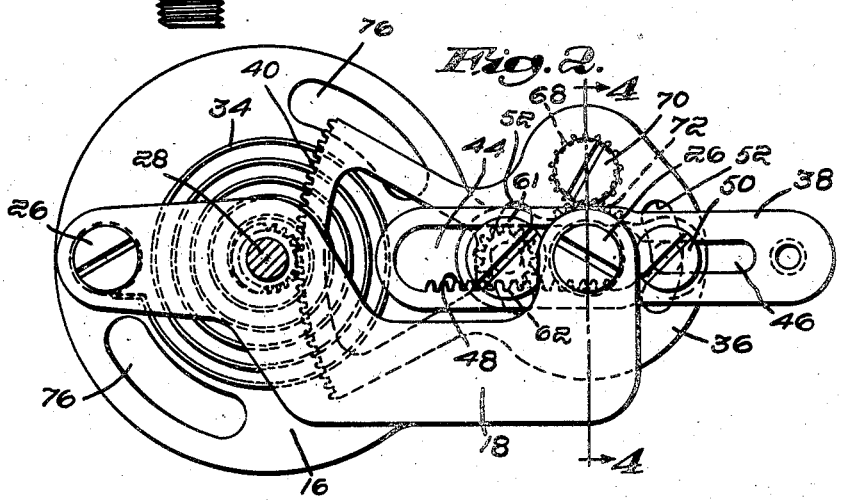
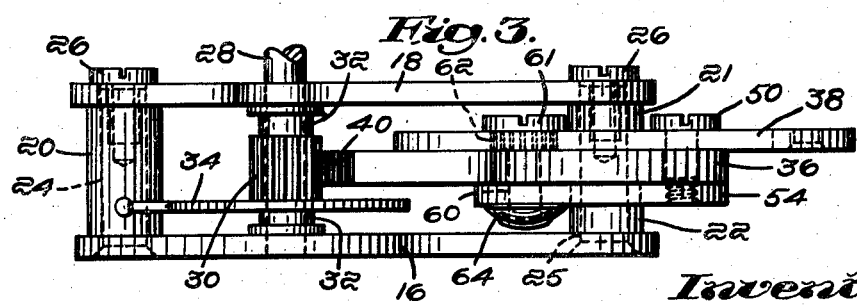
Inventors
Nils G. Olson,
Howard G. Musgrave,
by Kenway & Witter Attorneys

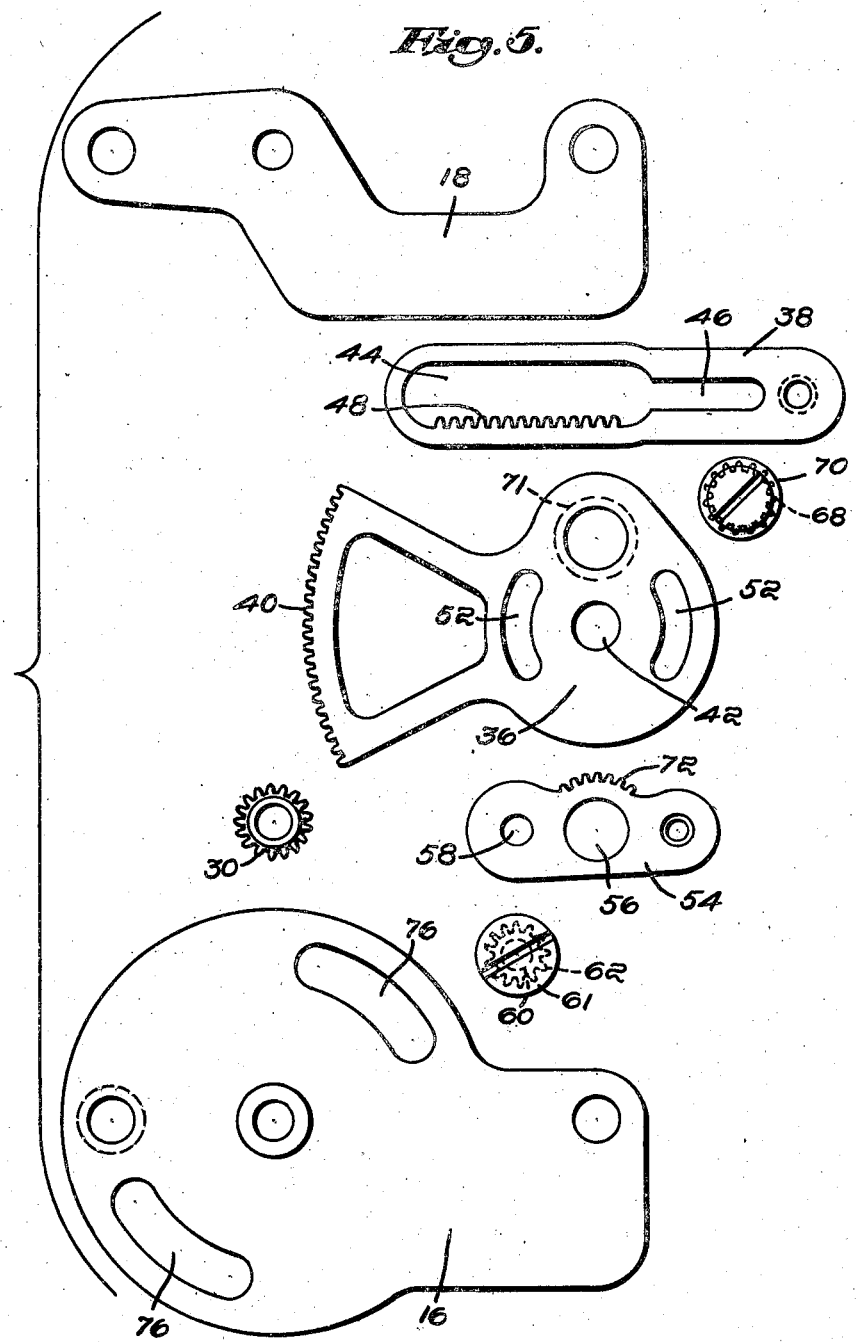

Patented Aug. 20, 1946

2,406,098

UNITED STATES PATENT OFFICE 2,406,098

INDEX ACTUATING MECHANISM

Howard George Musgrave, Newton, and Nils G. Olson, Boston, Mass.

Application November 27, 1944, Serial No. 565,312

9 Claims. (Cl. 74—90)

This invention relates to index actuating mechanism including a pivoted gear segment and especially concerns a novel combination of elements so combined and assembled that the segment and its operating means can be positively accurately and relatively adjusted both longitudinally and arcuately for purposes which will hereinafter appear. The invention is particularly applicable for use in pressure gauges and the like employing a Bourdon tube having its free end connected to an arm adjustably fixed to and operating the gear segment which in turn is geared to and operates an index movable over the gauge dial. Our invention more particularly concerns a novel combination of elements compactly associated with the arm and segment and providing for relative longitudinal adjustment of the arm and angular adjustment thereof relative to the pivot axis, and the primary object of the invention resides in the production of a new and superior combination of this nature and for the purpose described.

These and other features of the invention will be best understood and appreciated from the following description of a preferred embodiment thereof selected for purposes of illustration and shown in the accompanying drawings wherein, Fig. 1 is a front elevation of a pressure gauge actuating mechanism embodying our invention, Fig. 2 is an enlarged elevation of the actuating mechanism;

Fig. 3 is a plan view thereof,

Fig. 4 is a sectional view taken on line 4—4 of Fig. 2,

Fig. 5 is an exploded view of the parts comprising the said mechanism.

The pressure gauge illustrated in Fig. 1 comprises a post 10 carrying a vertically extending plate 12 and a Bourdon tube 14. Our improved index mechanism is adapted to be mounted on the plate 12 as illustrated in Fig. 1 and hereinafter described and is adapted to be connected to the free end of the Bourdon tube and to be actuated thereby.

The index actuating mechanism is mounted in a frame comprising a back plate 16, a front plate 18 and spaced bushings 20, 21 and 22 therebetween. The bushings are mounted on studs 24 and 25 fixed to the back plate, and the front plate is secured by screws 26 threaded into the studs. An index staff or shaft 28 is mounted for rotation in the frame and has a pinion 30 fixed thereto between bushings 32. A hair spring 34 has one end fixed to the staff and its other end to the frame.

The actuating mechanism for the index staff is disposed between the front and rear plates of the frame and includes a two-part member mounted for pivotal movement on and about the stud 25. The two parts comprise a segment 36 and an actuating arm 38 in face to face contact, the segment having arcuately disposed teeth 40 on its outer end for engaging the pinion 30. The stud 25 passes through a hole 42 in the segment and through an oblong opening 44 in the arm. The arm also has a relatively narrow slot 46 open to, parallel with and extending beyond the opening, and rack teeth 48 provided on the arm along and extending into the opening.

The segment 36 and arm 38 are secured together by a screw 50 extending through the slot 46 in the arm and one of two arcuate openings 52 in the segment and threaded into a plate 54, the head of the screw being in tight face to face contact with the arm. The plate 54 has an opening 56 therethrough receiving the bushing 22 and also an opening 58 receiving the centrally disposed axle 60 of a member having an outer head 61 and pinion teeth 62 therebeneath. The head 61 is in face to face contact with the arm. The toothed portion 62 is disposed in the opening 44 with the teeth thereof in mesh with the rack teeth 48 and the member is held in place by a resilient cap 64 secured to the free end of the axle and in contact with the plate 54. A link 66 pivotally connects the outer end of the arm 38 to the free end of the Bourdon tube.

Rotation of the pinion 62 is adapted to adjust the arm 38 longitudinally relative to the segment 36, and other means including a pinion 68 is provided for relatively adjusting the same parts arcuately about the pivot axis 25. The pinion 68 has a body portion rotatably mounted in the segment 36 and including an annular flange 70 seated within an annular recess 71. The pinion teeth 68 on the end of the member are in mesh with teeth 72 on the plate 54 and extending arcuately about the opening 56. As illustrated in Fig. 4, the flange 70 is disposed beneath the plate 54 which thereby serves to hold the member in its socket. The pinions 62 and 68 are provided with slots in their outer ends for receiving a screw driver to rotate the pinions.

The back plate 16 of the frame is mounted on and in face to face contact with the plate 12 and is secured thereto by screws 74 extending through slots 76 in the back plate and extending arcuately about the staff 28. The slot permits rotary adjustment of the frame on the support approximately to the required position, and the final adjustment can be secured conveniently and accurately by rotation of the pinion 68. It will be apparent that the screw 50 holds the segment 36 and arm 38 against relative movement and that when this screw is loosened the two parts can be relatively adjusted by rotating the pinions 62 and 68. Rotation of the pinion 68 relatively adjusts the members arcuately about the pivot stud 25 and its function is positively to bring the index to the exact indicating position on the dial scale of the gauge. Rotation of the pinion 62 likewise adjusts the arm radially of the pivot stud 25 and thereby increases or decreases the leverage action of the Bourdon tube on the segment 36. It will be understood that our new and novel combination thus provides a minute and accurate adjustment of the nature and for the purpose described and forms an index actuating mechanism that is superior to and more compact than like mechanisms heretofore known.

Having now disclosed our invention what we claim as new and desire to secure by Letters Patent of the United States is:

1. Index actuating mechanism, comprising a frame, a two-part member mounted for pivotal movement thereon, one part comprising a segment having arcuately disposed teeth on its outer end and the other part comprising an actuating arm, positive actuating means for adjusting the arm radially of and angularly about the pivot axis of the member and relative to the segment, and releasable means for securing the segment and arm together against relative movement.

2. The mechanism defined in claim 1 in which the first named means includes a plate fixed to one of said parts and having teeth disposed arcuately about said axis and engaged by a pinion carried by the other part.

3. The mechanism defined in claim 1 in which one of said parts is disposed between the other part at one face and a plate at its other face, the last named means comprising a bolt connecting the plate and said other part and extending through a slot in said one part disposed arcuately about said axis, and said adjusting means including a pinion carried by one part and in mesh with teeth on said plate.

4. The mechanism defined in claim 1 in which the said parts are in face to face contact, one part having an oblong opening therein extending radially of said axis, and said adjusting means including a pinion carried by the other part and disposed within said opening and in mesh with teeth on said one part and disposed along and within said opening.

5. Index actuating mechanism, comprising a frame, a two-part member mounted for pivotal movement thereon, one part comprising a segment having arcuately disposed teeth on its outer end and the other part comprising an actuating arm, positive actuating means for adjusting the arm angularly about the pivotal axis of the member relative to the segment, and releasable means for securing the segment and arm together against relative movement.

6. The mechanism defined in claim 5 in which the first named means includes a plate fixed to one of said parts and having teeth disposed arcuately about said axis and engaged by a pinion carried by the other part.

7. The mechanism defined in claim 5 in which the first named means includes a plate fixed to one of said parts and having teeth disposed arcuately about said axis and engaged by a pinion carried by the other part, said pinion being integral with an element rotatably mounted in said other part and having a flange disposed between the plate and said other part and serving to hold the element against axial movement in said other part.

8. The mechanism defined in claim 5 in which one of said parts is disposed between the other part at one face and a plate at its other face, the last named means comprising a bolt connecting the plate and said other part and extending through a slot in said one part disposed arcuately about said axis, and said adjusting means including a pinion carried by one part and in mesh with teeth on said plate.

9. In mechanism of the class described, two members in face to face contact, one of said members having a slot and a relatively wider and parallel oblong opening therethrough, rack teeth on said one member and extending into and along the opening, an axle carrying the other member and extending through the slot, and a rotary member having a flange resting on the outer face of said one member, a gear integral therewith beneath the flange and disposed within the opening and a portion extending therefrom and rotatably journaled in the other member, the gear being of a diameter substantially equal to the width of the opening and being in mesh with the rack teeth.

HOWARD GEORGE MUSGRAVE.
NILS G. OLSON.